United States Patent
Waku et al.

(10) Patent No.: US 8,690,733 B2
(45) Date of Patent: Apr. 8, 2014

(54) VEHICLE CONTROL SYSTEM AND CONTROL METHOD THEREOF

(75) Inventors: Kousuke Waku, Hadano (JP); Masayuki Miyazono, Isehara (JP); Hideshi Wakayama, Hadano (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 304 days.

(21) Appl. No.: 13/302,399

(22) Filed: Nov. 22, 2011

(65) Prior Publication Data

US 2012/0135837 A1    May 31, 2012

(30) Foreign Application Priority Data

Nov. 26, 2010   (JP) ................................. 2010-264117

(51) Int. Cl.
     *B60W 10/02*      (2006.01)
     *B60W 10/06*      (2006.01)

(52) U.S. Cl.
     USPC ........................................................ 477/175

(58) Field of Classification Search
     USPC ........................................................ 477/175
     See application file for complete search history.

(56) References Cited

U.S. PATENT DOCUMENTS

| | | | |
|---|---|---|---|
| 6,227,999 B1 * | 5/2001 | Wheeler | 477/174 |
| 6,258,008 B1 | 7/2001 | Tabata et al. | |
| 6,344,016 B1 * | 2/2002 | Eguchi | 477/175 |
| 2003/0073540 A1 | 4/2003 | Eguchi et al. | |
| 2004/0153231 A1 | 8/2004 | Itoh et al. | |
| 2006/0166789 A1 | 7/2006 | Katou et al. | |
| 2009/0156355 A1 * | 6/2009 | Oh et al. | 477/5 |

FOREIGN PATENT DOCUMENTS

JP      2000-153726 A      6/2000

* cited by examiner

*Primary Examiner* — Sherry Estremsky
(74) *Attorney, Agent, or Firm* — Foley & Lardner LLP

(57) ABSTRACT

A time required until the friction element is completely engaged is delayed when a switch from a non-driving position to a driving position is detected or when the engine automatic stop condition no longer holds until the differential rotation of the friction element disappears after the engine automatic stop condition holds as compared with the case where the switch from the non-driving position to the driving position is detected or the engine automatic stop condition no longer holds after the differential rotation of the friction element disappears.

15 Claims, 8 Drawing Sheets

VEHICLE CONTROL SYSTEM AND CONTROL METHOD THEREOF

FIELD OF THE INVENTION

The present invention relates to a control of a friction element in a vehicle which can automatically stop an engine.

BACKGROUND OF THE INVENTION

A vehicle equipped with an automatic transmission includes a forward/reverse switching mechanism (friction element) capable of switching engaged and released states according to a hydraulic pressure between an engine and the transmission, and the friction element is engaged when a driving range such as a D-range or an R-range is selected while being released when a non-driving range such as an N-range or a P-range is selected. The engaged and released states of the friction element is controlled by a line pressure which is a hydraulic pressure supplied from an oil pump driven by the engine. Since the oil pump also stops when the engine stops, the line pressure is reduced to release the friction element.

It is known to, in such a vehicle, automatically stop the engine when a predetermined automatic stop condition holds during a stopped state and restart the engine when a restart condition holds. Further, JP2000-153726A discloses that an engine is restarted and an instruction pressure to the friction element is suddenly increased to promptly engage a friction element when an engine restart condition holds.

SUMMARY OF THE INVENTION

Here, even if the engine automatic stop condition holds and fuel supply is stopped to automatically stop the engine, the rotation of the engine does not stop immediately. Further, since the oil pump is driven by the engine, the line pressure does not similarly immediately become zero and, instead, is reduced as the rotation of the engine is reduced.

Since the engine automatic stop condition holds while the engine is operating and the vehicle is in a stopped state, there is differential rotation between an input side (engine side) and an output side (transmission side) of the friction element immediately after the automatic stop condition holds.

For example, since the friction element is kept in the released state while the vehicle is stopped in the N-range, the input side of the friction element is rotated together with the engine via a torque converter and the output side thereof is stopped since the drive wheels do not rotate at all when the automatic stop condition holds. That is, differential rotation is produced in the friction element until the engine completely stops after the automatic stop condition holds.

Differential rotation between the engine side and the transmission side is absorbed by the torque converter while the vehicle is stopped in the D-range, but an engagement pressure of the friction element is reduced as the line pressure is reduced and the friction element is released when the automatic stop condition holds and the engine automatically stops. Then, the input side of the friction element is rotated together with a turbine of the torque converter, thereby producing differential rotation between the input side and the output side of the friction element.

If it is determined that the friction element needs to be engaged while differential rotation is produced in the friction element in this way, such as if a shift is made to the D-range while the vehicle is stopped in the N-range or if the engine automatic stop condition no longer holds while the vehicle is stopped in the D-range, a shock corresponding to the differential rotation may possibly occur as the friction element is suddenly engaged when an instruction pressure to the friction element is suddenly increased.

The present invention aims to suppress a shock which occurs at the time of engaging a friction element when the friction element needs to be engaged immediately after an engine automatic stop condition holds.

According to an aspect of the present invention, a vehicle control system for a vehicle including an oil pump for producing a hydraulic pressure by being driven by a drive force of an engine and a friction element interposed between the engine and drive wheels and engaged by having the hydraulic pressure supplied thereto, includes an engine automatic stopping unit which automatically stops the engine when an engine automatic stop condition holds and restarting the engine when the engine automatic stop condition no longer holds; a differential rotation calculating unit which calculates differential rotation which is a rotation speed difference between an input side and an output side of the friction element while the engine is automatically stopped; and an engagement time delaying unit which delays a time required until the friction element is completely engaged when a switch from a non-driving position to a driving position is detected or when the engine automatic stop condition no longer holds until the differential rotation of the friction element disappears after the engine automatic stop condition holds as compared with the case where the switch from the non-driving position to the driving position is detected or the engine automatic stop condition no longer holds after the differential rotation of the friction element disappears.

According to another aspect of the present invention, a vehicle control method for a vehicle including an oil pump for producing a hydraulic pressure by being driven by a drive force of an engine and a friction element interposed between the engine and drive wheels and engaged by having the hydraulic pressure supplied thereto, includes automatically stopping the engine when an engine automatic stop condition holds and restarting the engine when the engine automatic stop condition no longer holds; calculating differential rotation which is a rotation speed difference between an input side and an output side of the friction element while the engine is automatically stopped; and delaying a time required until the friction element is completely engaged when a switch from a non-driving position to a driving position is detected or when the engine automatic stop condition no longer holds until the differential rotation of the friction element disappears after the engine automatic stop condition holds as compared with the case where the switch from the non-driving position to the driving position is detected or the engine automatic stop condition no longer holds after the differential rotation of the friction element disappears.

Embodiments and advantages of this invention will be described in detail below with reference to the attached figures.

DESCRIPTION OF THE PREFERRED EMBODIMENT

First, a first embodiment is described.

Figure 1:
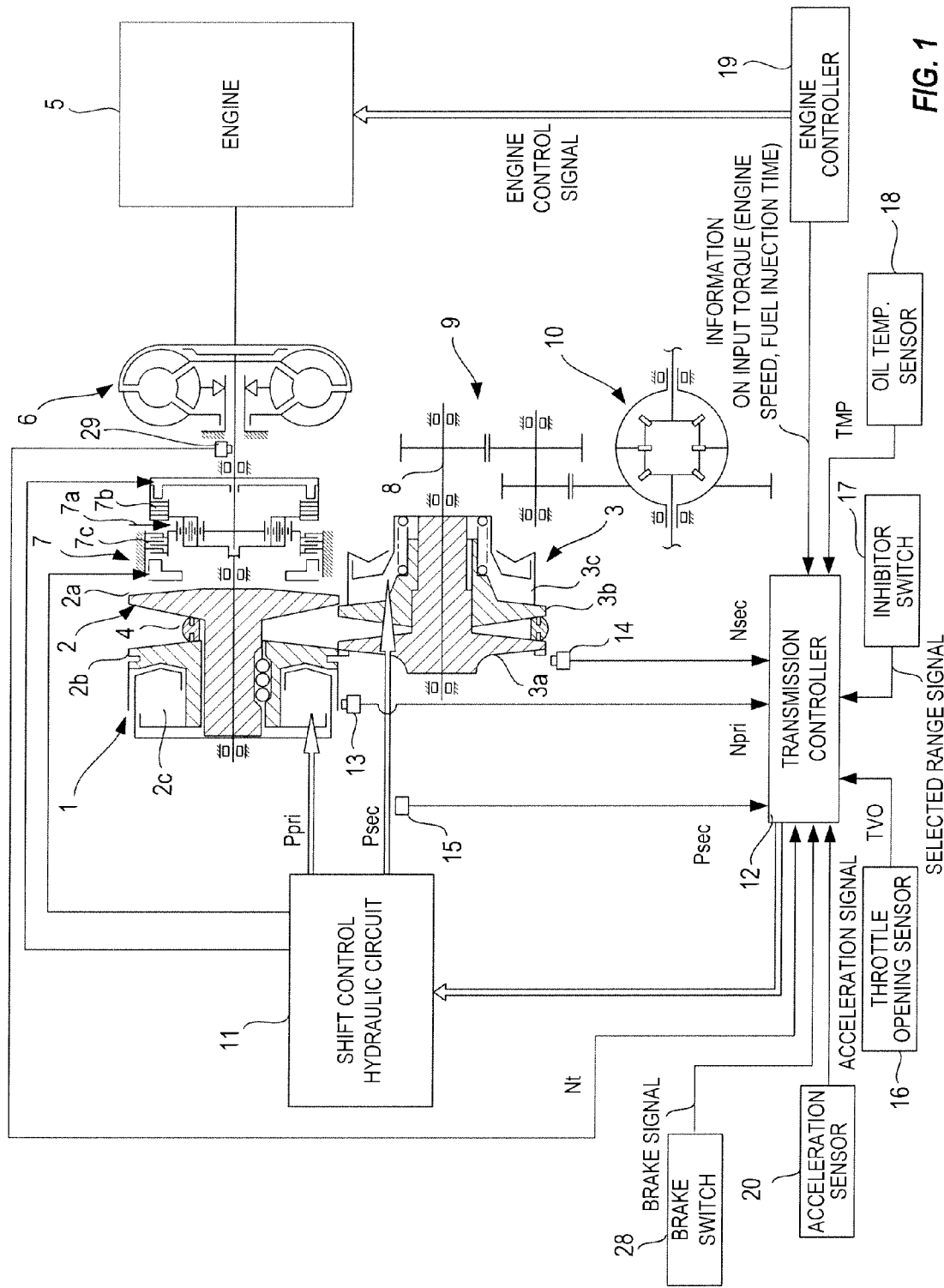
FIG. 1 is a schematic construction diagram showing the configuration of a vehicle control system according to an embodiment.

FIG. 1 is a schematic construction diagram schematically showing a V-belt continuously variable transmission 1. The V-belt continuously variable transmission 1 includes a primary pulley 2 and a secondary pulley 3 arranged such that V-grooves thereof are aligned, and a V-belt (belt) 4 is mounted in the V-grooves of these pulleys 2, 3. An engine 5 is arranged coaxially with the primary pulley 2, and a torque converter 6 including a lock-up clutch and a forward/reverse switching mechanism (friction element) 7 are successively provided from the side of the engine 5 between the engine 5 and the primary pulley 2.

The forward/reverse switching mechanism 7 includes a double-pinion planetary gear set 7a as a main constituent element, and a sun gear of the double-pinion planetary gear set 7a is connected to the engine 5 via the torque converter 6 and a carrier thereof is connected to the primary pulley 2. The forward/reverse switching mechanism 7 further includes a forward clutch 7b which directly connects the sun gear and the carrier of the double-pinion planetary gear set 7a and a reverse brake 7c which brakes a ring gear of the same. When this forward clutch 7b is engaged, input rotation from the engine 5 via the torque converter 6 is transmitted to the primary pulley 2 as it is. When the reverse brake 7c is engaged, input rotation from the engine 5 via the torque converter 6 is transmitted to the primary pulley 2 while being reversed.

Rotation of the primary pulley 2 is transmitted to the secondary pulley 3 via the V-belt 4, and rotation of the secondary pulley 3 is then transmitted to wheels via an output shaft 8, a gear set 9 and a differential gear device 10.

To make a rotation transmission ratio (speed ratio) between the primary pulley 2 and the secondary pulley 3 changeable during the above power transmission, ones of conical plates forming the V-grooves of the primary pulley 2 and the secondary pulley 3 are fixed conical plates 2a, 3a and the other conical plates 2b, 3b are movable conical plates (movable flanges) displaceable in axial directions. These movable conical plates 2b, 3b are biased toward the fixed conical plates 2a, 3a by supplying a primary pulley pressure Ppri and a secondary pulley pressure Psec produced using a line pressure as a source pressure to a primary pulley chamber 2c and a secondary pulley chamber 3c, whereby the V-belt 4 is frictionally engaged with the conical plates to transmit power between the primary pulley 2 and the secondary pulley 3.

In shifting the transmission, contact radii of the V-belt 4 on the pulleys 2, 3 are continuously changed by changing the widths of the V-grooves of the both pulleys 2, 3 by a differential pressure between a primary pulley pressure Ppri and a secondary pulley pressure Psec produced in correspondence with a target speed ratio Ratio0, whereby an actual speed ratio Ratio is changed to realize the target speed ratio Ratio0.

The primary pulley pressure Ppri and the secondary pulley Psec are controlled by a shift control hydraulic circuit 11 together with outputs of engagement hydraulic pressures of the forward clutch 7b that is engaged when a forward driving range is selected and the reverse brake 7c that is engaged when a reverse driving range is selected. The shift control hydraulic circuit 11 executes a control in response to a signal from a transmission controller 12.

To the transmission controller 12 are input a signal from a primary pulley rotation speed sensor 13 for detecting a primary pulley rotation speed Npri, a signal from a secondary pulley rotation speed sensor 14 for detecting a secondary pulley rotation speed Nsec, a signal from a secondary pulley pressure sensor 15 for detecting the secondary pulley pressure Psec, a signal from a throttle opening sensor 16 for detecting an opening TVO of a throttle valve, a selected range signal from an inhibitor switch 17, a signal from an oil temperature sensor 18 for detecting a transmission hydraulic oil temperature TMP, signals (engine speed, fuel injection time) relating to an input torque Ti from an engine controller 19 responsible for the control of the engine 5, a brake signal from a brake pedal switch 28 for detecting whether or not a brake pedal has been operated, a signal from an acceleration sensor 20 and a signal from a turbine rotation speed sensor 29 for detecting a rotation speed of a turbine runner of the torque converter.

Figure 2:
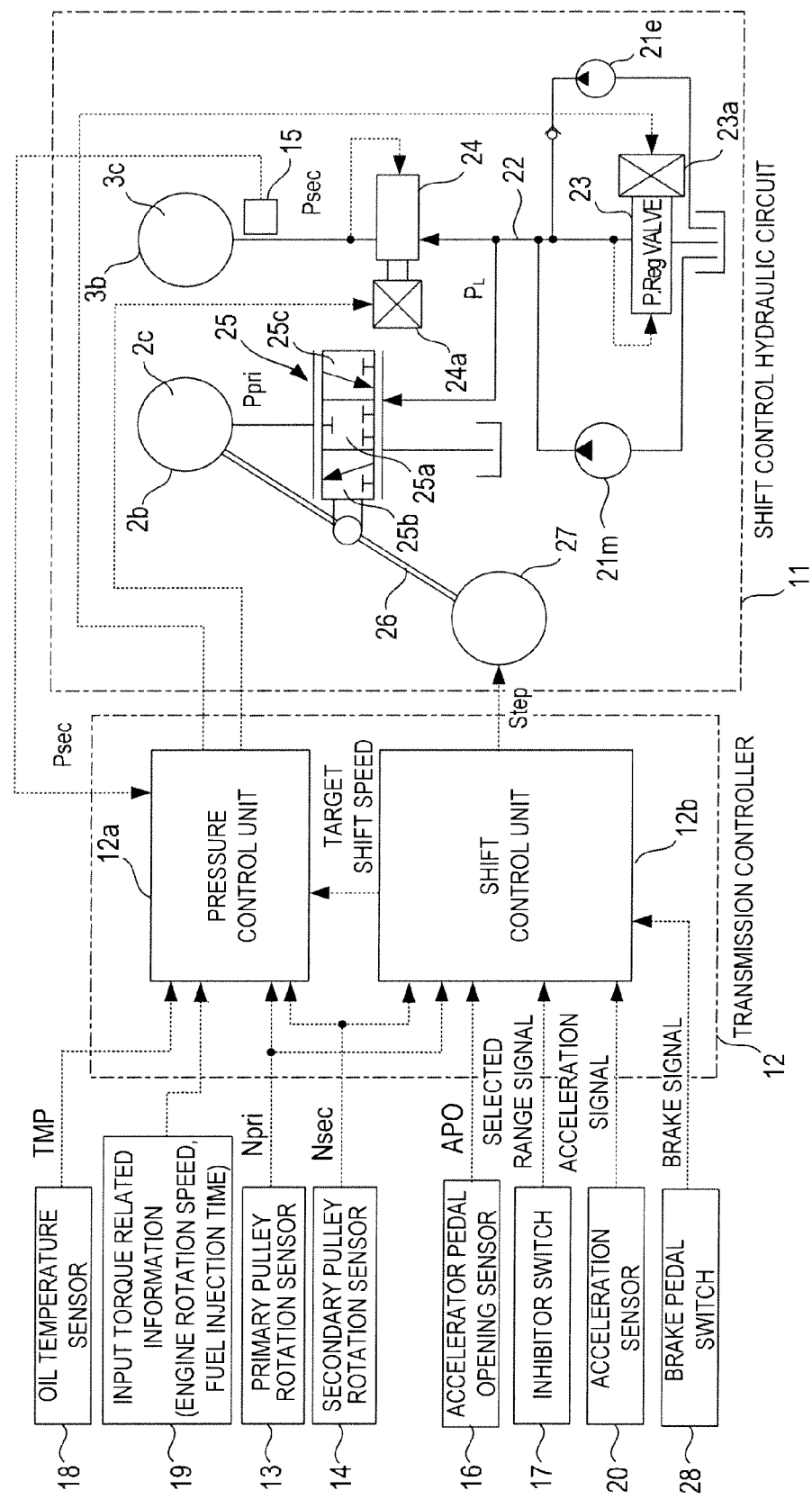
FIG. 2 is a schematic construction diagram showing the configurations of a shift control hydraulic circuit and a transmission controller in the embodiment.

Next, the shift control hydraulic circuit 11 and the transmission controller 12 are described using a schematic construction diagram of FIG. 2. First, the shift control hydraulic circuit 11 is described below.

The shift control hydraulic circuit 11 includes an engine-driven mechanical oil pump 21m and an electrical oil pump 21e driven by power supplied from a battery mounted in the vehicle, and regulates pressures of hydraulic oil supplied to an oil path 22 from the respective oil pumps 21m, 21e to a predetermined line pressure PL by a pressure regulator valve 23. The pressure regulator valve 23 controls the line pressure PL according to a driving duty to a solenoid 23a.

The line pressure PL of the oil path 22 is, on one hand, regulated by a pressure reducing valve 24 and supplied as the secondary pulley pressure Psec to the secondary pulley chamber 3c and, on the other hand, regulated by a shift control valve 25 and supplied as the primary pulley pressure Ppri to the primary pulley chamber 2c. The pressure reducing valve 24 controls the secondary pulley pressure Psec according to a driving duty to a solenoid 24a.

The shift control valve 25 has a neutral position 25a, a pressure increasing position 25b and a pressure reducing position 25c and is connected to a substantially middle part of a shift link 26 to switch these valve positions. A step motor 27 as a shift actuator is connected to one end of the shift link 26, and the movable conical plate 2b of the primary pulley 2 is connected to the other end.

The step motor 27 is set at an operational position advanced by a step number Step corresponding to the target speed ratio Ratio0 from a reference position, and the shift link 26 pivots about its part connected to the movable conical plate 2b by the operation of the step motor 27, whereby the shift control valve 25 is moved from the neutral position 25a to the pressure increasing position 25b or the pressure reducing position 25c. In this way, the primary pulley pressure Ppri is increased using the line pressure PL as a source pressure or reduced by being drained and the differential pressure between the primary pulley pressure Ppri and the secondary pulley pressure Psec is changed, whereby an upshift to a higher speed ratio or a downshift to a lower speed ratio is performed and the actual speed ratio Ratio changes, following the target speed ratio Ratio0.

The progress of a shift is fed back to the corresponding end of the shift link 26 via the movable conical plate 2b of the primary pulley 2 and the shift link 26 pivots about its part connected to the step motor 27 in a direction to return the shift control valve 25 from the pressure increasing position 25b or the pressure reducing position 25c to the neutral position 25a. In this way, the shift control valve 25 is returned to the neutral position 25a when the target speed ratio Ratio0 is achieved and the speed ratio Ratio can be kept at the target speed ratio Ratio0.

The solenoid driving duty of the pressure regulator valve 23, that of the pressure reducing valve 24 and a shift command (step number) to the step motor 27 are given by the transmission controller 12. The transmission controller 12 is composed of a pressure control unit 12a and a shift control unit 12b.

The pressure control unit 12a determines the solenoid driving duty of the pressure regulator valve 23 and that of the pressure reducing valve 24 and, as shown in FIG. 1, supplies engagement hydraulic pressures to the forward clutch and the reverse brake. The shift control unit 12b calculates an achieved speed ratio DsrRTO and the target speed ratio Ratio0.

Here, the operation of the mechanical oil pump 21m and the electrical oil pump 21e is described.

Since the mechanical oil pump 21m is driven using partial power of the engine 5, the hydraulic pressure cannot be supplied to the shift control hydraulic circuit 11 while the engine 5 is stopped. Accordingly, to ensure the hydraulic pressure during the engine stop, the electrical oil pump 21e is driven while the engine 5 is stopped.

Note that "while the engine 5 is stopped" mentioned here does not include a case where the vehicle is in a parked state (key-off state) and means a state where the vehicle is in an operating state (key-on state after the engine starts) (including vehicle speed=0) and the engine 5 is in a stopped state. Further, that "the engine 5 is stopped" does not necessarily require that rotation of the engine 5 is completely stopped and includes extremely low-speed rotation at which a necessary hydraulic pressure cannot be ensured only by the mechanical oil pump 21m.

That is, the electrical oil pump 21e is operated when the engine 5 is automatically stopped by an idle stop control. During an idle stop, the friction elements 7b, 7c of the forward/reverse switching mechanism 7 are engaged or a piston is stroked by a hydraulic pressure produced by the electrical oil pump 21e, whereby a time required until the friction elements 7b, 7c can transmit power at the time of restarting the engine can be shortened.

The idle stop control is described below.

The idle stop control is a control for suppressing fuel consumption amount by automatically stopping the engine 5 (idle stop) while the vehicle is in a stopped state and controlled by the engine controller 19.

Upon performing the idle stop, the engine controller 19 determines conditions a1 to a3 listed below.
- a1: vehicle is in a stopped state (VSP=0)
- a2: brake pedal is depressed (brake fluid pressure is a predetermined value or higher)
- a3: accelerator pedal is not depressed at all (accelerator pedal opening APO=0)

The engine controller 19 determines that an idle stop condition holds when all of these conditions a1 to a3 hold and pen fits the idle stop to stop fuel injection and stop the engine 5.

The engine controller 19 determines whether or not the above conditions a1 to a3 respectively continue to hold also during the idle stop, determines that the idle stop condition does not hold when even one of these conditions no longer holds, and stops the idle stop, i.e. restarts the engine 5.

In the vehicle thus constructed, when the above idle stop conditions a1 to a3 hold with the non-driving range selected, the idle stop is performed and fuel supply to the engine 5 is stopped. At this time, the forward clutch 7b is in the released state, the input side of the forward clutch 7b is rotated together with the engine 5 via the torque converter 6, and the output side thereof is stopped since the drive wheels do not rotate at all. That is, differential rotation is produced between the input side and the output side of the forward clutch 7b. The differential rotation is gradually reduced to disappear as the engine rotation is reduced.

Thereafter, when a switch is made, for example, from the N-range to the D-range by the operation of a driver, an instruction pressure to the forward clutch 7b is suddenly increased with the idle stop continued. This is because the electrical oil pump 21e has a smaller capacity than the mechanical oil pump 21m and the instruction pressure needs to be increased in a stepwise manner to promptly engage the forward clutch 7b.

However, even if the idle stop condition holds and fuel supply to the engine 5 is stopped, engine rotation does not immediately become zero. The mechanical oil pump 21m is driven by the engine 5 and produces the hydraulic pressure while the engine 5 is rotating. Accordingly, when a switch is made to the D-range immediately after the idle stop condition holds (after starting the automatic stop of the engine 5), the hydraulic pressure from the mechanical oil pump 21m can also be supplied in addition to the hydraulic pressure from the electrical oil pump 21e, wherefore an actual pressure is increased by as much as the hydraulic pressure from the mechanical oil pump 21m and a shock may possibly occur due to sudden engagement of the forward clutch 7b if the instruction pressure to the forward clutch 7b is suddenly increased.

Similarly, in the case of a switch from the N-range to the R-range, a shock may possibly occur in the reverse brake 7c due to sudden engagement of the reverse brake 7c. Since the idle stop condition does not hold in this case, the engine 5 is restarted as the reverse brake 7c is engaged.

That the "differential rotation disappears" means that "rotation speed difference between the input side and the output side of the friction element 7b, 7c becomes zero".

Figure 3:
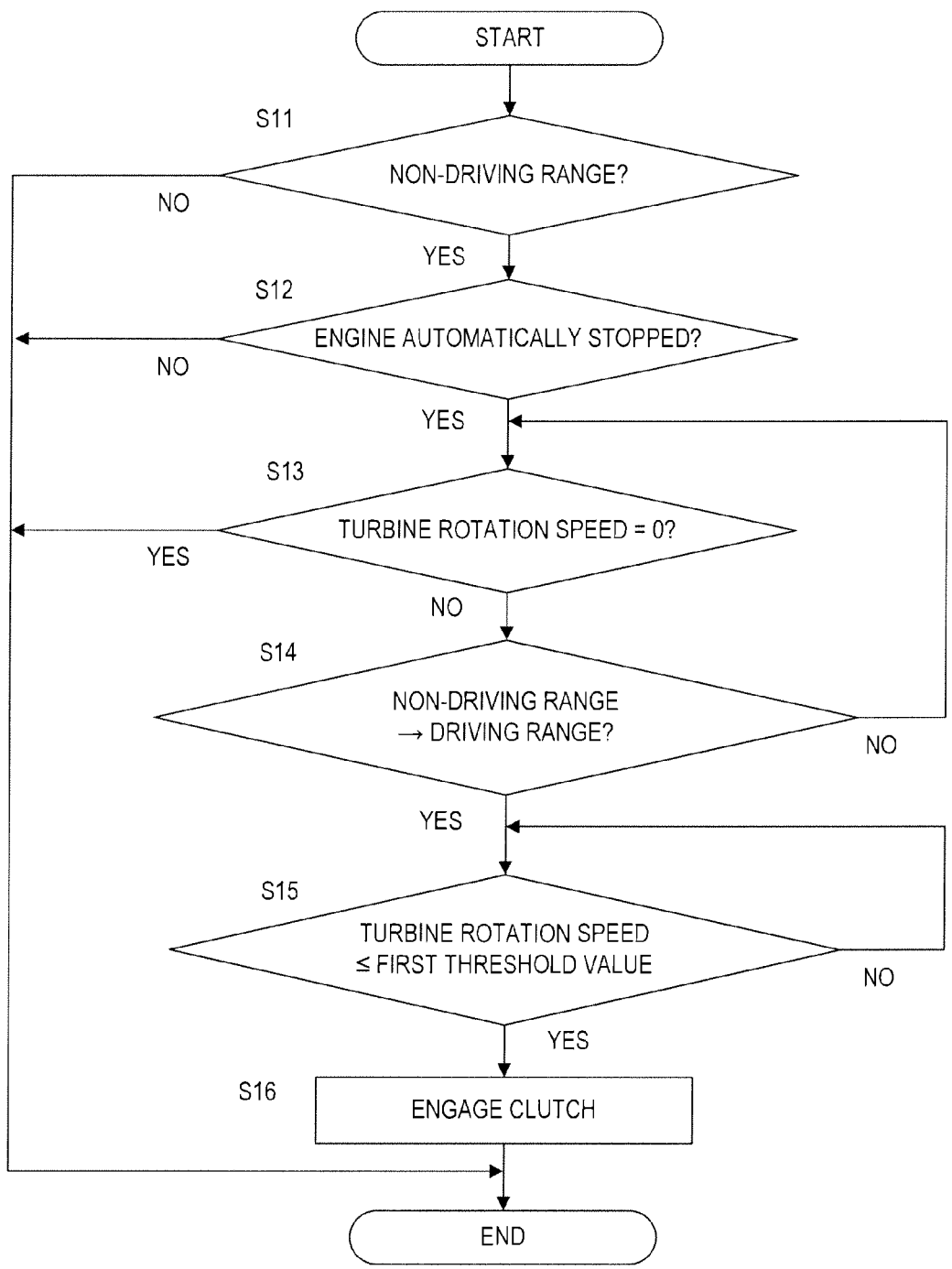
FIG. 3 is a flow chart showing the flow of a control in a first embodiment.

Accordingly, in this embodiment, the following control is executed in the transmission controller 12. FIG. 3 is a flow chart showing the flow of a hydraulic control for the forward clutch 7b and the reverse brake 7c in this embodiment. Note that the forward clutch 7b and the reverse brake 7c are collectively referred to as "friction elements 7b, 7c" in the following description.

In Step S11, the transmission controller 12 determines whether or not the non-driving range is selected. The process proceeds to Step S12 when it is determined that the non-driving range is selected while ending when it is determined that the driving range is selected. The non-driving range is, for example, the N-range and the P-range, and the driving range is, for example, the D-range and the R-range.

In Step S12, the transmission controller 12 determines whether or not the engine 5 is in an automatically stopped state (during the idle stop). The process proceeds to Step S13 when the engine 5 is determined to be in the automatically stopped state while ending when the engine 5 is determined not to be in the automatically stopped state. Whether or not the engine 5 is in the automatically stopped state is determined based on a signal transmitted from the engine controller 19 that executes the idle stop control.

In Step S13, the transmission controller 12 determines whether or not the rotation speed of the turbine runner that is the output side of the torque converter 6 is zero. The process ends when the rotation speed of the turbine is determined to be zero while proceeding to Step S14 when the rotation speed of the turbine is determined not to be zero.

In Step S14, the transmission controller 12 determines whether or not the selected range has been switched from the non-driving range to the driving range. The process proceeds to Step S15 when it is determined that the switch to the driving range has been made while returning to Step S13 when it is determined that no switch has been made.

In Step S15, the transmission controller 12 determines whether or not the rotation speed of the turbine is equal to or lower than a first threshold value. The process proceeds to Step S16 when the rotation speed of the turbine is determined to be equal to or lower than the first threshold value, whereas Step S15 is performed again when it is determined to be higher than the first threshold value. The first threshold value (engagement determining rotation speed) is such a value at which a shock occurring in engaging the friction elements 7b, 7c does not give any discomfort to a driver, and set beforehand. That is, an unpleasant shock may possibly occur if the friction elements 7b, 7c are engaged when the rotation speed of the turbine is higher than the first threshold value.

Here, a shock caused at the time of engaging the friction elements 7b, 7c becomes larger as the differential rotation of the friction elements 7b, 7c at the time of engaging the friction element increases. Since the idle stop is in effect when this Step is performed, the vehicle speed (rotation speed at the output side of the friction element) is zero. That is, since the differential rotation of the friction elements 7b, 7c is equal to the rotation speed of the turbine, determination is made based on the rotation speed of the turbine and the first threshold value in Step S15.

In Step S16, the transmission controller 12 increases an instruction pressure to the friction elements 7b, 7c in a stepwise manner up to an instruction pressure at the time of normal engagement. In this way, the friction elements 7b, 7c are engaged.

As described above, in this control, the instruction pressure to the friction elements 7b, 7c is increased after waiting until the rotation speed of the turbine becomes equal to or lower than the first threshold value when the selected range is switched to the driving range until the rotation speed of the turbine becomes zero after the engine 5 is automatically stopped. Further, when the selected range is not switched, the process ends when the rotation speed of the turbine becomes zero.

Figure 4:
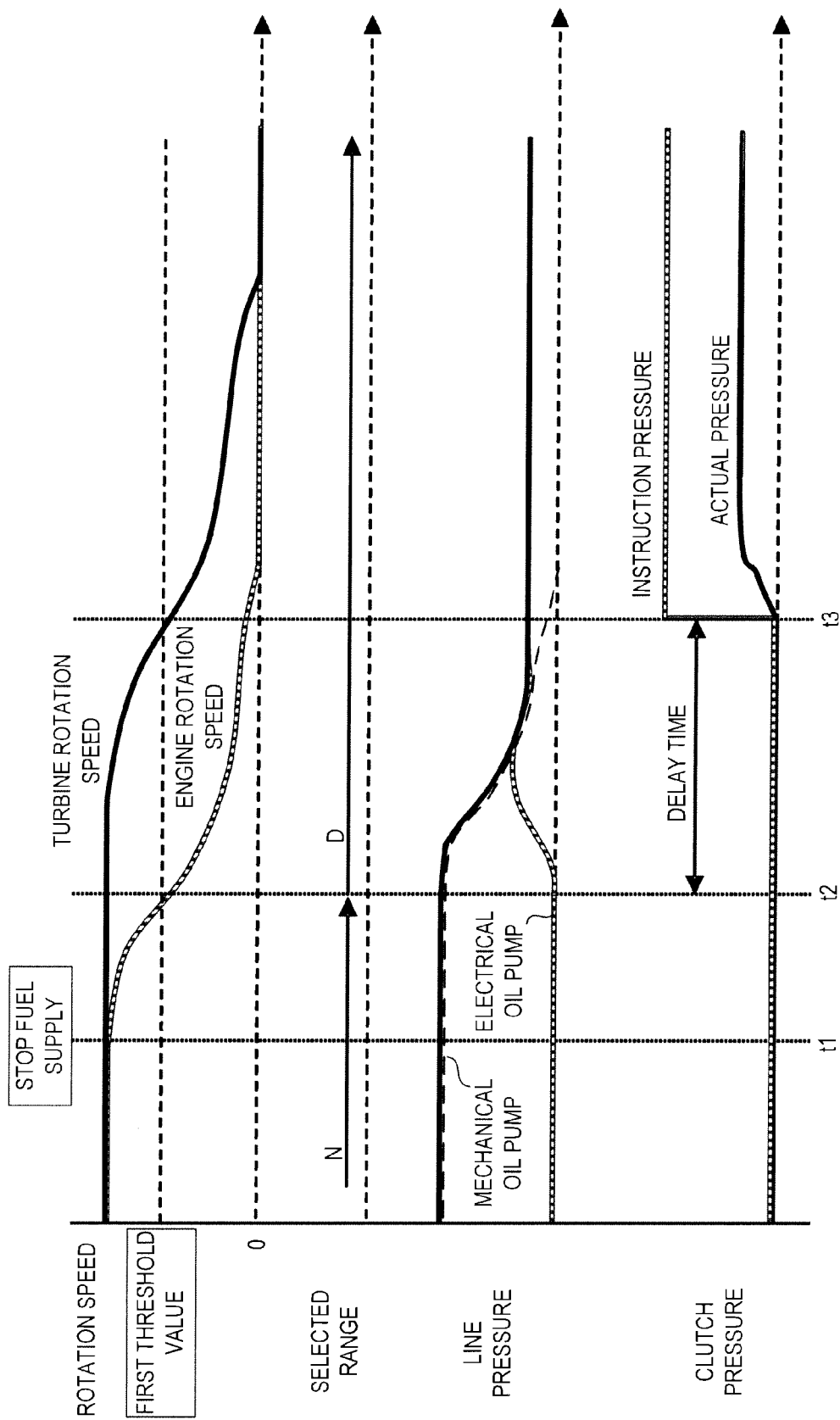
FIG. 4 is a time chart showing functions of the first embodiment.

Next, functions of this embodiment are described with reference to FIG. 4.

While the vehicle is stopped in the N-range, the idle stop condition holds and fuel supply to the engine 5 is stopped at time t1. This causes the rotation speed of the engine 5 to be gradually reduced and the rotation speed of the turbine to be reduced with a delay.

At time t2, a select lever is switched from the N-range to the D-range by the driver. However, since the rotation speed of the turbine is higher than the first threshold value at this time, the instruction pressure to the friction elements 7b, 7c is not increased yet.

Thereafter, the rotation speed of the turbine is reduced with a slight delay following a reduction in the rotation speed of the engine 5. Further, the line pressure is increased by the hydraulic pressure supplied from the electrical oil pump 21e. However, since the instruction pressure to the friction elements 7b, 7c is zero at this point of time, the friction elements 7b, 7c are still in the released state.

When the rotation speed of the turbine becomes equal to or lower than the first threshold value at time t3, the instruction pressure to the friction elements 7b, 7c is increased in a stepwise manner. Since the hydraulic pressure discharged from the mechanical oil pump 21m is lower than that discharged from the electrical oil pump 21e at this time, the line pressure is equivalent to the discharge pressure of the electrical oil pump 21e. Further, since the rotation speed of the turbine is equal to or lower than the first threshold value, the differential rotation in the friction elements 7b, 7c is also reduced. Thus, even if the instruction pressure to the friction elements 7b, 7c is increased in a stepwise manner, such a shock as to give discomfort to the driver does not occur.

As described above, in this embodiment, a time required until the friction elements 7b, 7c are completely engaged is delayed when a switch is made from the non-driving range to the driving range immediately after the idle stop condition holds and the engine 5 is automatically stopped and when the differential rotation of the friction elements 7b, 7c does not disappear. This can prevent the hydraulic pressures supplied from the oil pumps 21m, 21e to the friction elements 7b, 7c from being suddenly increased and can suppress the occurrence of a shock corresponding to the differential rotation of the friction elements 7b, 7c, for example, when the driver switches the select lever to the D-range again immediately after switching it from the D-range to the N-range.

Further, when a switch is made from the N-range to the D-range immediately after the idle stop, the instruction pressure to the friction elements 7b, 7c is increased after the differential rotation of the friction elements 7b, 7c becomes equal to or lower than the first threshold value. Thus, a shock associated with the engagement can be suppressed while the time required until the friction elements 7b, 7c are completely engaged is shortened as much as possible.

Next, a second embodiment is described.

Figure 5:
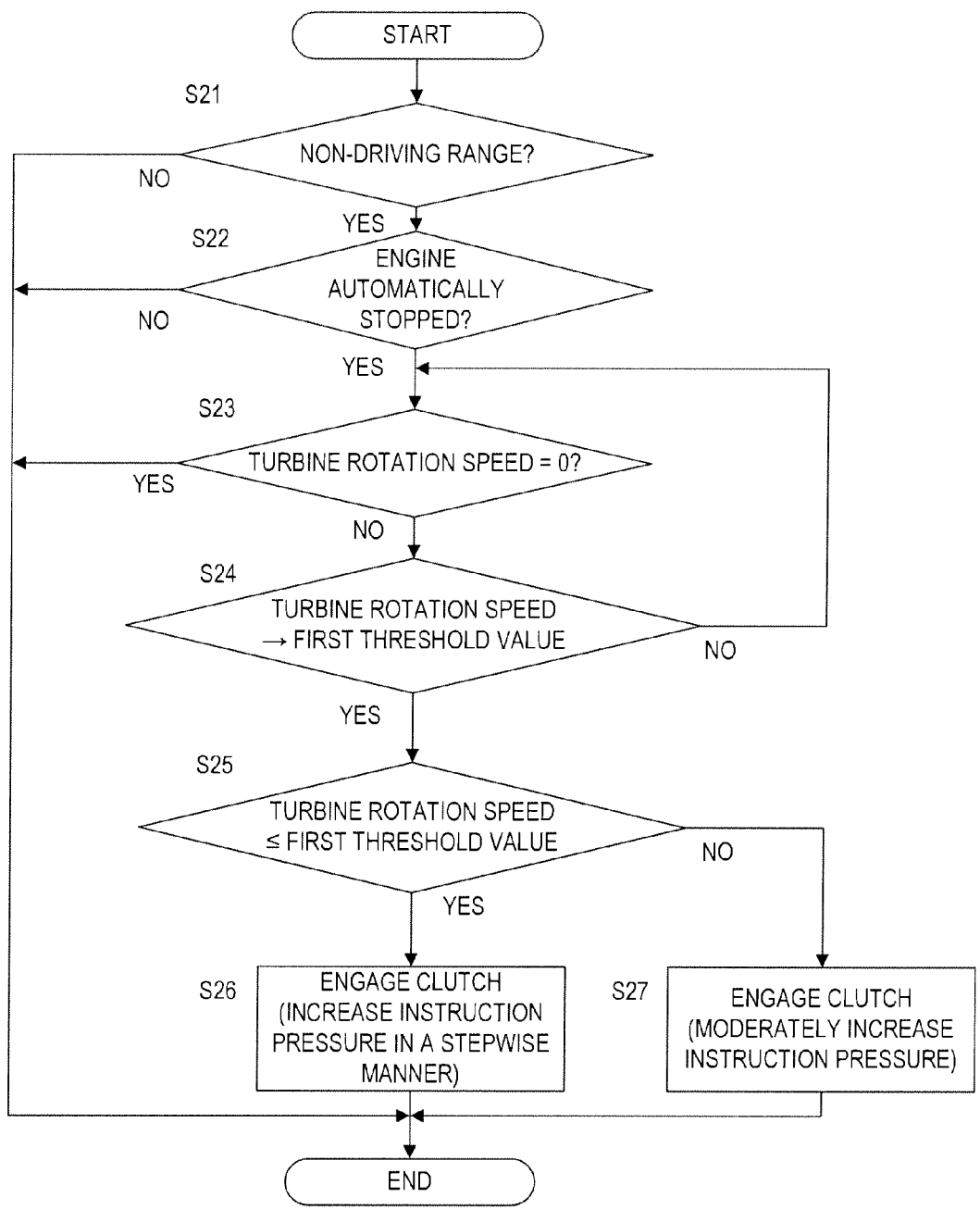
FIG. 5 is a flow chart showing the flow of a control in a second embodiment.

In this embodiment, a presupposed configuration is the same as in the first embodiment (FIGS. 1 and 2), but the contents of a control differ. FIG. 5 is a flow chart showing the flow of a hydraulic control of the friction elements 7b, 7c in this embodiment.

Control contents in Steps S21 to S25 are identical to those in Steps S11 to S15 of the first embodiment. In this embodiment, the process proceeds to Step S26 when the rotation speed of the turbine is determined to be equal to or lower than the first threshold value in Step S25 while proceeding to Step S27 when it is determined to be higher than the first threshold value.

In Step S26, the transmission controller 12 increases the instruction pressure to the friction elements 7b, 7c to an instruction pressure at the time of a normal idle stop. The instruction pressure at the time of the normal idle stop is the same as the one instructed in Step S16 of the first embodiment, and the instruction pressure is increased in a stepwise manner. In this way, the friction elements 7b, 7c are engaged.

In Step S27, the transmission controller 12 gradually increases the instruction pressure to the friction elements 7b, 7c with time instead of setting it to a fixed value. This causes the friction elements 7b, 7c to be gradually engaged.

As described above, in this control, the instruction pressure to the friction elements 7b, 7c is increased as usual if the rotation speed of the turbine is equal to or lower than the first threshold value while being gradually increased if the rotation speed of the turbine is higher than the first threshold value when the selected range is switched to the driving range until the rotation speed of the turbine becomes zero after the engine 5 is automatically stopped.

Figure 6:
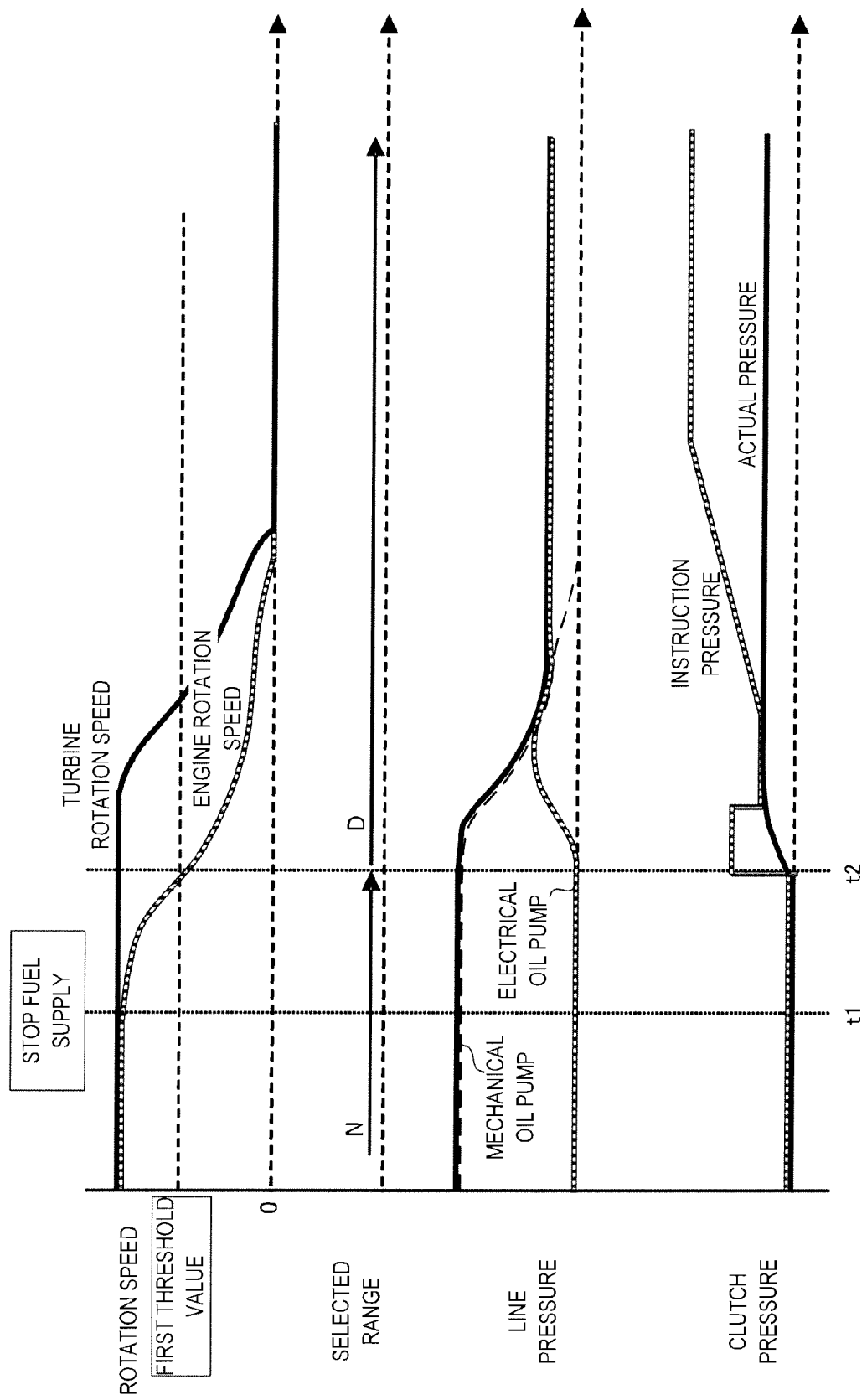
FIG. 6 is a time chart showing functions of the second embodiment.

Next, functions of this embodiment are described with reference to FIG. 6.

While the vehicle is stopped in the N-range, the idle stop condition holds and fuel supply to the engine 5 is stopped at time t1. This causes the rotation speed of the engine 5 to be gradually reduced.

At time t2, the select lever is switched from the N-range to the D-range by the driver. However, since the rotation speed of the turbine is higher than the first threshold value at this time, the instruction pressure to the friction elements 7b, 7c is gradually increased. In this way, the instruction pressure is gradually increased and the actual pressure is also gradually increased according to the instruction pressure.

Accordingly, even if the friction elements 7b, 7c are engaged, such a shock as to give discomfort to the driver does not occur.

As described above, in this embodiment, when a switch is made from the N-range to the D-range immediately after the idle stop, the hydraulic pressure supplied to the friction elements 7b, 7c is moderately increased as compared to the case where a switch is made to the D-range after the differential rotation of the friction elements 7b, 7c disappears. Thus, a time required from the start to the end of the engagement becomes longer and a shock occurring at the time of engaging the friction elements 7b, 7c can be suppressed.

Next, a third embodiment is described.

In this embodiment, the electrical oil pump 21e is not provided unlike the first embodiment and a configuration for reducing the line pressure as the engine 5 stops and the discharge pressure of the mechanical oil pump 21m is reduced is presupposed.

Control contents also differ from those of the first embodiment. Although a case where the idle stop is performed with the non-driving range selected is described in the first and second embodiments, a case where the idle stop is performed while the vehicle is stopped in the D-range is described in this embodiment.

Since the forward clutch 7b is in the engaged state while the vehicle is stopped in the D-range, the input side (impeller side) of the torque converter 6 is rotated together with the engine 5 and the output side (turbine side) thereof is stopped since the drive wheels do not rotate at all. That is, the torque converter 6 is in a state to absorb the differential rotation. When the idle stop condition holds in this state, fuel supply to the engine 5 is stopped and engine rotation is reduced.

The hydraulic pressure discharged from the mechanical oil pump 21m is also reduced and the line pressure is reduced as the engine rotation is reduced. Since the forward clutch 7b is released as the line pressure is reduced, members from the turbine side of the torque converter 6 to the input side of the forward clutch 7b are rotated together with the engine 5 via the torque converter 6. In this way, differential rotation is produced between the input side and the output side of the forward clutch 7b.

If the brake pedal is released, for example, by the operation of the driver in this state, the idle stop condition no longer holds. Since the instruction pressure to the forward clutch 7b is kept at the instruction pressure in normal time also during the idle stop (before the idle stop condition no longer holds), the forward clutch 7b experiencing the differential rotation is suddenly engaged and a shock may possibly occur in association with this sudden engagement.

Figure 7:
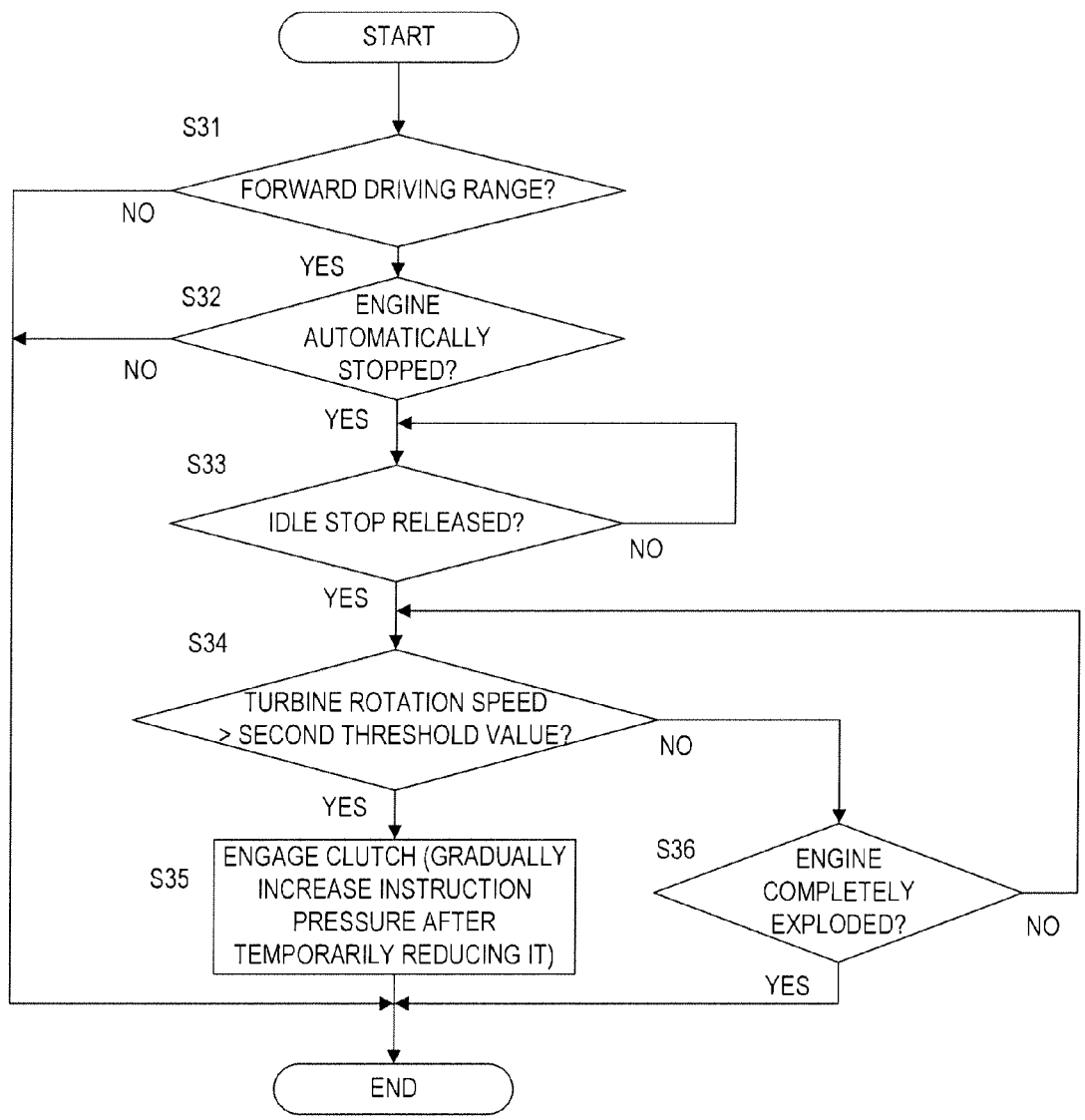
FIG. 7 is a flow chart showing the flow of a control in a third embodiment.

Accordingly, in this embodiment, the transmission controller 12 executes the following control. FIG. 7 is a flow chart showing the flow of a hydraulic control of the friction element 7b in this embodiment.

In Step S31, the transmission controller 12 determines whether or not the forward driving range (D-range) is selected. The process proceeds to Step S32 when it is determined that the forward driving range is selected while ending when it is determined that the forward driving range is not selected.

In Step S32, the transmission controller 12 determines whether or not the engine 5 is in an automatically stopped state (during the idle stop). The process proceeds to Step S33 when the engine 5 is determined to be in the automatically stopped state while ending when the engine 5 is determined not to be in the automatically stopped state. Whether or not the engine 5 is in the automatically stopped state is determined based on a signal transmitted from the engine controller 19 that executes the idle stop control.

In Step S33, the transmission controller 12 determines whether or not the idle stop control has been canceled. The process proceeds to Step S34 when it is determined that the idle stop control has been canceled, whereas Step S33 is performed again when it is determined that the idle stop control has not been canceled.

In Step S34, the transmission controller 12 determines whether or not the rotation speed of the turbine is higher than a second threshold value. The process proceeds to Step S35 when the rotation speed of the turbine is determined to be higher than the second threshold value while proceeding to Step S36 when it is determined to be equal to or lower than the second threshold value. The second threshold value is such a value at which the occurrence of an unpleasant shock can be judged when the friction element 7b is suddenly engaged, and is set beforehand. That is, an unpleasant shock may possibly occur if the friction element 7b is engaged when the rotation speed of the turbine is higher than the second threshold value.

In Step S35, the transmission controller 12 outputs an instruction pressure so as to slowly engage the friction element 7b. Since the instruction pressure is kept at the instruction pressure in normal time also during the idle stop, the instruction pressure is gradually increased after being temporarily reduced to a predetermined low pressure in Step 3GS. This causes the friction element 7b to be slowly engaged.

In Step S36, the transmission controller 12 determines whether or not the engine 5 has completely exploded. The process ends when it is determined that the engine 5 has completely exploded while returning to Step S34 when it is determined that the engine has not completely exploded.

As described above, in this control, the instruction pressure to the friction element 7b is gradually increased when the idle stop condition no longer holds after the engine 5 is automatically stopped and until turbine rotation is reduced again after being increased. Further, when the idle stop condition no longer holds after the turbine rotation is reduced, the instruction pressure to the friction element 7b is increased in a stepwise manner as usual.

Figure 8:
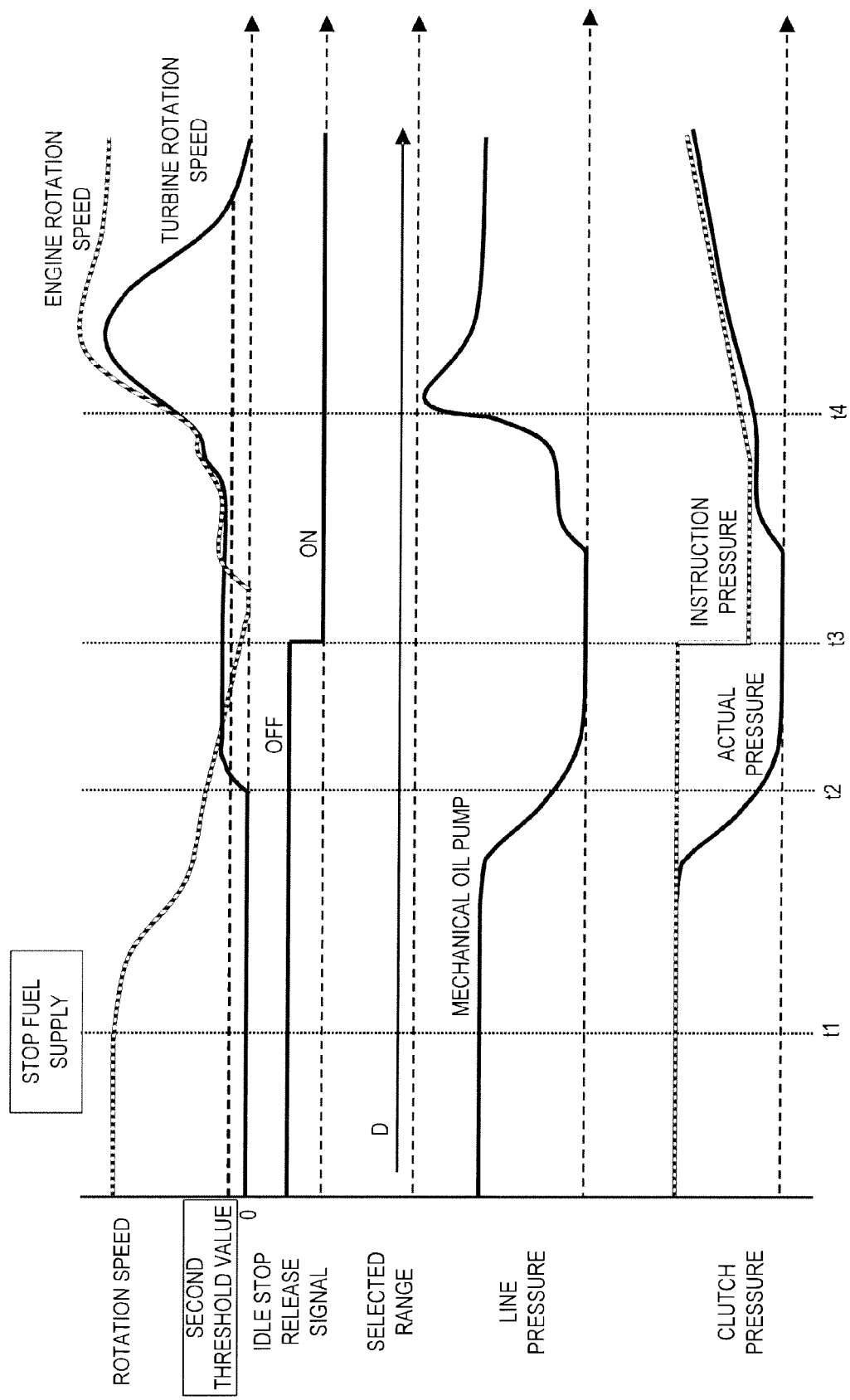
FIG. 8 is a time chart showing functions of the third embodiment.

Next, functions of this embodiment are described with reference to FIG. 8.

While the vehicle is stopped in the D-range, the idle stop condition holds and fuel supply to the engine 5 is stopped at time t1. This causes the rotation speed of the engine 5 to be gradually reduced and causes the line pressure and the engagement pressure of the friction element 7b to be reduced.

Due to a reduction in the engagement pressure of the friction element 7b, differential rotation is produced between the input side and the output side of the friction element 7b at time t2.

Thereafter, when the brake pedal is released at time t3, the idle stop condition no longer holds and an idle stop release signal is transmitted from the engine controller 19. Since the rotation speed of the turbine is higher than the second threshold value at this time, the instruction pressure to the friction element 7b is gradually increased after being temporarily reduced to the predetermined low pressure. This causes an actual pressure to be gradually increased according to the instruction pressure.

Accordingly, a shock which occurs according to the differential rotation when the friction element 7b is engaged is suppressed.

As described above, in this embodiment, when the idle stop condition no longer holds immediately after the idle stop in the D-range and when the differential rotation of the friction elements 7b, 7c does not disappear, the hydraulic pressure supplied to the friction elements 7b, 7c is more slowly increased as compared with the case where the idle stop condition no longer holds after the differential rotation of the friction elements 7b, 7c disappears. Thus, a time required from the start to the end of the engagement becomes longer and a shock caused at the time of engaging the friction elements 7b, 7c can be suppressed.

Although the embodiments of the present invention have been described above, the above embodiments are merely application examples of the present invention and not of the nature to limit the technical scope of the present invention to the specific configurations of the above embodiments. Various changes can be made without departing from the gist of the present invention.

For example, in the first and second embodiments, the first threshold value may be set at zero. If the rotation speed of the turbine is zero, the differential rotation at the time of engaging the friction elements 7b, 7c is zero. Thus, a shock at the time of the engagement can be more reliably prevented, and durability of the friction elements 7b, 7c can be improved.

Whether or not a predetermined engagement delay time has elapsed after it is determined in Steps S14, S24 that the selected range has been switched from the non-driving range to the driving range may be determined instead of determining whether or not the rotation speed of the turbine is equal to or lower than the first threshold value in Steps S15, S25 of the first and second embodiments. In this case, the engagement delay time is set at such a time as not to cause any shock unpleasant to the driver even if the friction elements 7b, 7c are engaged.

This causes the instruction pressure to the friction elements 7b, 7c to be increased after the elapse of the predetermined engagement delay time after the engagement of the friction elements 7b, 7c is determined to be necessary. Thus, as compared with the case where the instruction pressure to the friction elements 7b, 7c is increased immediately after the switch, the differential rotation at the time of the engagement is reduced and a shock at the time of the engagement can be suppressed by that much.

This application claims priority based on Japanese Patent Application No. 2010-264117, filed with the Japan Patent Office on Nov. 26, 2010, the entire content of which is incorporated into this specification by reference.

What is claimed is:

1. A vehicle control system for a vehicle including an oil pump for producing a hydraulic pressure by being driven by a drive force of an engine and a friction element interposed between the engine and drive wheels and engaged by having the hydraulic pressure supplied thereto, comprising:
    an engine automatic stopping unit which automatically stops the engine when an engine automatic stop condition holds and restarting the engine when the engine automatic stop condition no longer holds;
    a differential rotation calculating unit which calculates differential rotation which is a rotation speed difference between an input side and an output side of the friction element while the engine is automatically stopped; and
    an engagement time delaying unit which delays a time required until the friction element is completely engaged when a switch from a non-driving position to a driving position is detected or when the engine automatic stop condition no longer holds until the differential rotation of the friction element disappears after the engine automatic stop condition holds as compared with the case where the switch from the non-driving position to the driving position is detected or the engine automatic stop condition no longer holds after the differential rotation of the friction element disappears.

2. The vehicle control system according to claim 1, wherein the engagement time delaying unit delays the time required until the friction element is completely engaged by bringing the friction element into an engaged state after the elapse of an engagement delay time after the switch from the non-driving position to the driving position is detected.

3. The vehicle control system according to claim 1, wherein the engagement time delaying unit delays the time required until the friction element is completely engaged by bringing the friction element into an engaged state after the differential rotation becomes equal to or lower than an engagement determining rotation speed.

4. The vehicle control system according to claim 3, wherein the engagement determining rotation speed is zero.

5. The vehicle control system according to claim 1, wherein the engagement time delaying unit more slowly increases the hydraulic pressure supplied to the friction element as compared with the case where the switch from the non-driving position to the driving position is detected after the differential rotation of the friction element disappears.

6. A vehicle control method for a vehicle including an oil pump for producing a hydraulic pressure by being driven by a drive force of an engine and a friction element interposed between the engine and drive wheels and engaged by having the hydraulic pressure supplied thereto, comprising:
    automatically stopping the engine when an engine automatic stop condition holds and restarting the engine when the engine automatic stop condition no longer holds;
    calculating differential rotation which is a rotation speed difference between an input side and an output side of the friction element while the engine is automatically stopped; and
    delaying a time required until the friction element is completely engaged when a switch from a non-driving position to a driving position is detected or when the engine automatic stop condition no longer holds until the differential rotation of the friction element disappears after the engine automatic stop condition holds as compared with the case where the switch from the non-driving position to the driving position is detected or the engine automatic stop condition no longer holds after the differential rotation of the friction element disappears.

7. The control method according to claim 6, wherein the time required until the friction element is completely engaged is delayed by bringing the friction element into an engaged state after the elapse of an engagement delay time after the switch from the non-driving position to the driving position is detected.

8. The control method according to claim 6, wherein the time required until the friction element is completely engaged is delayed by bringing the friction element into an engaged state after the differential rotation becomes equal to or lower than an engagement determining rotation speed.

9. The control method according to claim 8, wherein the engagement determining rotation speed is zero.

10. The control method according to claim 6, wherein the hydraulic pressure supplied to the friction element is more slowly increased as compared with the case where the switch from the non-driving position to the driving position is detected after the differential rotation of the friction element disappears.

11. A vehicle control system for a vehicle including an oil pump for producing a hydraulic pressure by being driven by a drive force of an engine and a friction element interposed between the engine and drive wheels and engaged by having the hydraulic pressure supplied thereto, comprising:
   engine automatic stopping means for automatically stopping the engine when an engine automatic stop condition holds and restarting the engine when the engine automatic stop condition no longer holds;
   differential rotation calculating means for calculating differential rotation which is a rotation speed difference between an input side and an output side of the friction element while the engine is automatically stopped; and
   engagement time delaying means for delaying a time required until the friction element is completely engaged when a switch from a non-driving position to a driving position is detected or when the engine automatic stop condition no longer holds until the differential rotation of the friction element disappears after the engine automatic stop condition holds as compared with the case where the switch from the non-driving position to the driving position is detected or the engine automatic stop condition no longer holds after the differential rotation of the friction element disappears.

12. The vehicle control system according to claim 11, wherein the engagement time delaying means delays the time required until the friction element is completely engaged by bringing the friction element into an engaged state after the elapse of an engagement delay time after the switch from the non-driving position to the driving position is detected.

13. The vehicle control system according to claim 11, wherein the engagement time delaying means delays the time required until the friction element is completely engaged by bringing the friction element into an engaged state after the differential rotation becomes equal to or lower than an engagement determining rotation speed.

14. The vehicle control system according to claim 13, wherein the engagement determining rotation speed is zero.

15. The vehicle control system according to claim 11, wherein the engagement time delaying means more slowly increases the hydraulic pressure supplied to the friction element as compared with the case where the switch from the non-driving position to the driving position is detected after the differential rotation of the friction element disappears.

* * * * *